US010243734B2

(12) United States Patent
Brown et al.

(10) Patent No.: US 10,243,734 B2
(45) Date of Patent: Mar. 26, 2019

(54) ELLIPTIC CURVE RANDOM NUMBER GENERATION

(71) Applicant: Certicom Corp., Mississauga (CA)

(72) Inventors: Daniel Richard L. Brown, Mississauga (CA); Scott Alexander Vanstone, Campbellville (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 14/575,844

(22) Filed: Dec. 18, 2014

(65) Prior Publication Data

US 2015/0156019 A1 Jun. 4, 2015

Related U.S. Application Data

(63) Continuation of application No. 13/770,533, filed on Feb. 19, 2013, now Pat. No. 8,948,388, which is a
(Continued)

(51) Int. Cl.
*H04L 9/08* (2006.01)
*G06F 7/58* (2006.01)
(Continued)

(52) U.S. Cl.
CPC .......... *H04L 9/0869* (2013.01); *G06F 7/582* (2013.01); *G06F 7/588* (2013.01); *H04L 9/0662* (2013.01);
(Continued)

(58) Field of Classification Search
CPC ......... H04L 9/3066; G06F 21/30; G06F 21/50
(Continued)

(56) References Cited

U.S. PATENT DOCUMENTS 5,442,707 A     8/1995  Miyaji et al.
6,044,388 A *   3/2000  DeBellis ............... G06F 7/582
                                                        380/28
(Continued)

FOREIGN PATENT DOCUMENTS

CA         2381397        2/2001
JP       2001-222220      8/2001
(Continued)

OTHER PUBLICATIONS

ANS X9.62/2005; "Public Key Cryptography for the Financial Services Industry—The Elliptic Curve Digital Signature Algorithm (ECDSA)"; Nov. 16, 2005; 163 pages.
(Continued)

*Primary Examiner* — Lynn D Feild
*Assistant Examiner* — Viral S Lakhia
(74) *Attorney, Agent, or Firm* — Fish & Richardson P.C.

(57) ABSTRACT

An elliptic curve random number generator avoids escrow keys by choosing a point Q on the elliptic curve as verifiably random. An arbitrary string is chosen and a hash of that string computed. The hash is then converted to a field element of the desired field, the field element regarded as the x-coordinate of a point Q on the elliptic curve and the x-coordinate is tested for validity on the desired elliptic curve. If valid, the x-coordinate is decompressed to the point Q, wherein the choice of which is the two points is also derived from the hash value. Intentional use of escrow keys can provide for back up functionality. The relationship between P and Q is used as an escrow key and stored by for a security domain. The administrator logs the output of the generator to reconstruct the random number with the escrow key.

19 Claims, 6 Drawing Sheets

Related U.S. Application Data continuation of application No. 11/336,814, filed on Jan. 23, 2006, now Pat. No. 8,396,213.

(60) Provisional application No. 60/644,982, filed on Jan. 21, 2005.

(51) Int. Cl.
*H04L 9/30* (2006.01)
*H04L 9/06* (2006.01)
*G06F 7/72* (2006.01)

(52) U.S. Cl.
CPC .......... *H04L 9/0816* (2013.01); *H04L 9/0894* (2013.01); *H04L 9/3066* (2013.01); *G06F 7/725* (2013.01); *H04L 2209/20* (2013.01); *H04L 2209/24* (2013.01); *H04L 2209/26* (2013.01)

(58) Field of Classification Search
USPC .......... 380/28, 46, 37, 42, 30, 286; 708/254; 713/172; 705/40
See application file for complete search history.

(56) References Cited

U.S. PATENT DOCUMENTS

| | | | |
|---|---|---|---|
| 6,088,798 A | 7/2000 | Shimbo | |
| 6,122,375 A * | 9/2000 | Takaragi | H04L 9/0643 380/28 |
| 6,243,467 B1 | 6/2001 | Reiter et al. | |
| 6,263,081 B1 | 7/2001 | Miyaji et al. | |
| 6,285,761 B1 * | 9/2001 | Patel | G06F 7/586 380/28 |
| 6,307,935 B1 * | 10/2001 | Crandall | G06F 7/725 380/28 |
| 6,370,247 B1 | 4/2002 | Takaragi et al. | |
| 6,424,712 B2 | 7/2002 | Vanstone et al. | |
| 6,466,668 B1 * | 10/2002 | Miyazaki | G06F 7/728 380/30 |
| 6,477,254 B1 | 11/2002 | Miyazaki et al. | |
| 6,480,605 B1 * | 11/2002 | Uchiyama | H04L 9/3066 380/259 |
| 6,687,721 B1 * | 2/2004 | Wells | G06F 7/582 708/250 |
| 6,714,648 B2 | 3/2004 | Miyazaki et al. | |
| 6,738,478 B1 | 5/2004 | Vanstone et al. | |
| 6,882,958 B2 | 4/2005 | Schmidt et al. | |
| 6,990,201 B1 * | 1/2006 | Coron | G06F 17/17 380/277 |
| 7,000,110 B1 * | 2/2006 | Terao | H04L 9/3218 380/28 |
| 7,013,047 B2 | 3/2006 | Schmidt et al. | |
| 7,062,043 B1 | 6/2006 | Solinas | |
| 7,062,044 B1 | 6/2006 | Solinas | |
| 7,092,979 B1 | 8/2006 | Shim | |
| 7,124,443 B2 * | 10/2006 | Ishibashi | G06Q 20/00 705/51 |
| 7,162,033 B1 | 1/2007 | Coron et al. | |
| 7,171,000 B1 | 1/2007 | Toh et al. | |
| 7,197,527 B2 | 3/2007 | Naslund et al. | |
| 7,200,225 B1 | 4/2007 | Schroeppel | |
| 7,218,735 B2 | 5/2007 | Coron et al. | |
| 7,221,758 B2 | 5/2007 | Cramer et al. | |
| 7,224,795 B2 | 5/2007 | Takada et al. | |
| 7,225,341 B2 | 5/2007 | Yoshino et al. | |
| 7,308,096 B2 * | 12/2007 | Okeya | G06F 7/725 380/28 |
| 7,308,588 B2 * | 12/2007 | Nishizawa | G06K 19/077 257/E23.176 |
| 7,327,845 B1 * | 2/2008 | Orr | H04L 9/0656 367/117 |
| 7,353,395 B2 * | 4/2008 | Gentry | G06Q 20/3674 380/259 |
| 7,388,957 B2 * | 6/2008 | Ono | G06F 7/725 380/255 |
| 7,418,099 B2 | 8/2008 | Vanstone et al. | |
| 7,480,795 B2 | 1/2009 | Vanstone | |
| 7,542,568 B2 | 6/2009 | Ohmori et al. | |
| 7,599,491 B2 | 10/2009 | Lambert | |
| 7,613,917 B1 * | 11/2009 | Chojnacki | G01C 21/32 713/150 |
| 7,639,799 B2 | 12/2009 | Lauter et al. | |
| 7,650,507 B2 | 1/2010 | Crandall et al. | |
| 7,680,270 B2 * | 3/2010 | Srungaram | G06F 7/725 380/28 |
| 7,680,272 B2 * | 3/2010 | Yoon | G06F 7/726 380/28 |
| 7,853,013 B2 * | 12/2010 | Vasyltsov | G06F 7/725 380/28 |
| 7,907,726 B2 | 3/2011 | Lauter et al. | |
| 7,936,874 B2 * | 5/2011 | Futa | H04L 9/3066 380/28 |
| 7,961,874 B2 * | 6/2011 | Ibrahim | G06F 7/725 380/28 |
| 8,074,266 B2 | 12/2011 | Yoneda | |
| 8,411,855 B1 | 4/2013 | Robinson et al. | |
| 8,428,252 B1 | 4/2013 | Makepeace et al. | |
| 8,559,625 B2 | 10/2013 | Douguet et al. | |
| 8,619,977 B2 | 12/2013 | Douguet et al. | |
| 2002/0044649 A1 | 4/2002 | Gallant et al. | |
| 2003/0081785 A1 | 5/2003 | Boneh et al. | |
| 2003/0156714 A1 * | 8/2003 | Okeya | G06F 7/725 380/30 |
| 2004/0005053 A1 | 1/2004 | Koshiba | |
| 2004/0102242 A1 | 5/2004 | Poelmann et al. | |
| 2004/0247115 A1 * | 12/2004 | Ono | G06F 7/725 380/28 |
| 2005/0036609 A1 | 2/2005 | Eisentraeger et al. | |
| 2005/0251680 A1 | 11/2005 | Brown et al. | |
| 2006/0129800 A1 | 6/2006 | Lauter et al. | |
| 2006/0165231 A1 * | 7/2006 | Srungaram | G06F 7/725 380/30 |
| 2006/0285682 A1 | 12/2006 | Sarangarajan et al. | |
| 2007/0121933 A1 | 5/2007 | Futa et al. | |
| 2007/0248224 A1 | 10/2007 | Buskey et al. | |
| 2008/0056499 A1 | 3/2008 | Vanstone | |

FOREIGN PATENT DOCUMENTS

| | | |
|---|---|---|
| JP | 2003-507761 | 2/2003 |
| JP | 2005-500740 | 1/2005 |
| WO | 2001/13218 | 2/2001 |
| WO | 2001/35573 | 5/2001 |

OTHER PUBLICATIONS

ANSI X9.82; "Part 3 for X9F1" Oct. 2003; 175 pages.
ANS X9.82; "Part 3—Draft"; Jun. 2004; 189 pages.
Barker, Elaine and John Kelsey; "Recommendation for Random Number Generation Using Deterministic Random Bit Generators"; NIST Special Publication 800-90; National Institute of Standards and Technology; Dec. 2005; 130 pages.
Barker, Elaine and John Kelsey; "Recommendation for Random No. Generation Using Deterministic Random Bit Generators (Revised)"; NIST Special Publication 800-90; National Institute of Standards and Technology; Mar. 2007; 133 pages.
Blum, Manuel and Silvio Micali; "How to Generate Cryptographically Strong Sequences of Pseudo-Random Bits"; SIAM Journal on Computing; vol. 13, No. 4; Nov. 1984; pp. 850-864.
Brown, Daniel R.L.; "Conjecture Security of the ANSI-NIST Elliptic Curve RNG"; Cryptology ePrint Archive; Report 2006/117; Mar. 29, 2006; 14 pages. Retrieved from the internet <http://eprint.iacr.org>.
El Mahassni, Edwin and Igor Shparlinksi; "On the Uniformity of Distribution of Congruential Generators over Elliptic Curves"; Sequences and Their Applications: Proceedings of SETA '01; 2002' pp. 257-264.
Gjoesteen, Kristian; "Comments on Dual-EC-DRBG/NIST SP 800-90, Draft Dec. 2005"; Mar. 16, 2006; 8 pages.

(56) References Cited

OTHER PUBLICATIONS

Goldreich, Oded; Foundations of Cryptography Basic Tools; Cambridge University Press; 2001; pp. 30-183.

Guerel, Nicolas; "Extracting Bits from Coordinates of a Point of an Elliptic Curve"; Cryptology ePrint Archive; Report 2005/324; 2005; 9 pages. Retrieved from the internet <http://eprint.iacr.org>.

Johnson, Don B.; "X9.82 Part 3—Number Theoretic DRBGs"; NIST RNG Workshop; Jul. 20, 2004; retrieved from the internet <http://csrc.nist.gov/groups/ST/tooklit/documents/rng/NumberTheoreticDRBG.pdf>.

Kaliski, Burton S., Jr.; "A Pseudo-Random Bit Generator Based on Elliptic Logarithms"; Advances in Cryptology; CRYPTO 1986; vol. 263; pp. 84-103.

Lee, K. et al.; "Elliptic Curve Random Number Generation"; Electrical and Electronic Technology 2001; Proceedings of IEEE Region 10 International Conference; Aug. 19-22, 2001; pp. 239-241.

Lichota, Dr. RW; "Verifying the Correctness of Cryptographic Protocols Using 'Convince'" IEEE; Dec. 13, 1996; pp. 119-122.

Luby, Michael; "Pseudorandomness and Cryptographic Applications"; Princeton University Press; 1996; pp. 70-74.

Satoh, A.; "Scalable Dual-Field Elliptical Curve Cryptographic Processor"; IEEE, vol. 52; Apr. 2003; pp. 452-456.

Office Action issued in U.S. Appl. No. 11/336,814 dated Jun. 23, 2009; 10 pages.

Office Action issued in U.S. Appl. No. 11/336,814 dated Aug. 23, 2010; 22 pages.

Office Action issued in U.S. Appl. No. 11/336,814 dated Apr. 15, 2011; 31 pages.

Office Action issued in U.S. Appl. No. 11/336,814 dated Mar. 22, 2012; 9 pages.

Notice of Allowance issued in U.S. Appl. No. 11/336,814 dated Jul. 3, 2012; 8 pages.

Notice of Allowance issued in U.S. Appl. No. 11/336,814 dated Nov. 8, 2012.

Office Action issued in U.S. Appl. No. 13/770,533 dated Apr. 16, 2014; 11 pages.

Extended European Search Report issued in European Application No. 06704329.9 dated Nov. 12, 2009; 6 pages.

Official Action issued in Canadian Application No. 2,594,670 dated Aug. 9, 2012; 4 pages.

Notice of Allowance issued in Canadian Application No. 2,594,670 dated Mar. 21, 2014; 1 page.

Communication pursuant to Article 94(3) EPC issued in European Application No. 06704329.9 dated Mar. 10, 2010; 4 pages.

Communication pursuant to Article 94(3) EPC issued in European Application No. 06704329.9 dated Jul. 22, 2010; 4 pages.

Communication pursuant to Article 94(3) EPC issued in European Application No. 06704329.9 dated Jun. 15, 2011; 4 pages.

Office Action issued in Japanese Application No. 2007-551522 dated Aug. 26, 2011; 18 pages.

Office Action issued in Japanese Application No. 2007-551522 dated Jan. 18, 2012; 8 pages.

Notice of Final Rejection issued in Japanese Application No. 2007-551522 dated May 30, 2012; 7 pages.

Notice of Allowance issued in Japanese Application No. 2007-551522 dated Oct. 31, 2012; 3 pages.

Office Action issued in Japanese Application No. 2011-259363 dated Jan. 31, 2013; 12 pages.

Office Action issued in Japanese Application No. 2011-259363 dated Jun. 7, 2013; 13 pages.

International Search Report and Written Opinion of the International Searching Authority issued in International Application No. PCT/CA2006/000065 dated May 1, 2006; 11 pages.

International Preliminary Report on Patentability issued in International Application No. PCT/CA2006/000065 dated Aug. 2, 2007.

\* cited by examiner

ELLIPTIC CURVE RANDOM NUMBER GENERATION

This application is a continuation of and claims priority from U.S. patent application Ser. No. 13/770,533, filed on Feb. 29, 2013, which is a continuation of and claims priority from U.S. patent application Ser. No. 11/336,814, filed on Jan. 23, 2006 and issued as U.S. Pat. No. 8,396,213 on Mar. 12, 2013, which is hereby incorporated by reference and which claims priority from U.S. Provisional Patent Application No. 60/644,982 filed on Jan. 21, 2005.

FIELD OF THE INVENTION

The present invention relates to systems and methods for cryptographic random number generation.

DESCRIPTION OF THE PRIOR ART

Random numbers are utilised in many cryptographic operations to provide underlying security. In public key infrastructures, for example, the private key of a key pair is generated by a random number generator and the corresponding public key mathematically derived therefrom. A new key pair may be generated for each session and the randomness of the generator therefore is critical to the security of the cryptographic system.

To provide a secure source of random numbers, cryptographically secure pseudorandom bit generators have been developed in which the security of each generator relies on a presumed intractability of the underlying number-theoretical problem. The American National Standards Institute (ANSI) has set up an Accredited Standards Committee (ASC) X9 for the financial services industry, which is preparing a American National Standard (ANS) X9.82 for cryptographic random number generation (RNG). One of the RNG methods in the draft of X9.82, called Dual_EC_DRBG, uses elliptic curve cryptography (ECC) for its security. Dual_EC_DRBG will hereinafter be referred to as elliptic curve random number generation (ECRNG).

Elliptic curve cryptography relies on the intractability of the discrete log problem in cyclic subgroups of elliptic curve groups. An elliptic curve E is the set of points (x, y) that satisfy the defining equation of the elliptic curve. The defining equation is a cubic equation, and is non-singular. The coordinates x and y are elements of a field, which is a set of elements that can be added, subtracted and divided, with the exception of zero. Examples of fields include rational numbers and real numbers. There are also finite fields, which are the fields most often used in cryptography. An example of a finite field is the set of integers modulo a prime q.

Without the loss of generality, the defining equation of the elliptic curve can be in the Weierstrass form, which depends on the field of the coordinates. When the field F is integers modulo a prime q>3, then the Weierstrass equation takes the form $y^2=x^3+ax+b$, where a and b are elements of the field F.

The elliptic curve E includes the points (x, y) and one further point, namely the point O at infinity. The elliptic curve E also has a group structure, which means that the two points P and Q on the curve can be added to form a third point P+Q. The point O is the identity of the group, meaning P+O=O+P=P, for all points P. Addition is associative, so that P+(Q+R)=(P+Q)+R, and commutative, so that P+Q=Q+P, for all points P, Q and R. Each point P has a negative point −P, such that P+(−P)=O. When the curve equation is the Weierstrass equation of the form $y^2=x^3+ax+b$, the negative of P=(x, y) is determined easily as −P=(x, −y). The formula for adding points P and Q in terms of their coordinates is only moderately complicated involving just a handful of field operations.

The ECRNG uses as input two elliptic curve points P and Q that are fixed. These points are not assumed to be secret. Typically, P is the standard generator of the elliptic curve domain parameters, and Q is some other point. In addition a secret seed is inserted into the ECRNG.

The ECRNG has a state, which may be considered to be an integer s. The state s is updated every time the ECRNG produces an output. The updated state is computed as u=z(sP), where zO is a function that converts an elliptic curve point to an integer. Generally, z consists of taking the x-coordinate of the point, and then converting the resulting field element to an integer. Thus u will typically be an integer derived from the x-coordinate of the point s.

The output of the ECRNG is computed as follows: r=t(z(sQ)), where is a truncation function. Generally the truncation function removes the leftmost bits of its input. In the ECRNG, the number of bits truncated depends on the choice of elliptic curve, and typically may be in the range of 6 to 19 bits.

Although P and Q are known, it is believed that the output r is random and cannot be predicted. Therefore successive values will have no relationship that can be exploited to obtain private keys and break the cryptographic functions. The applicant has recognised that anybody who knows an integer d such that Q=dP, can deduce an integer e such that ed=1 mod n, where n is the order of G, and thereby have an integer e such that P=eQ. Suppose U=sP and R=sQ, which are the precursors to the updated state and the ECRNG output. With the integer e, one can compute U from R as U=eR. Therefore, the output r=t(z(R)), and possible values of R can be determined from r. The truncation function means that the truncated bits of R would have to be guessed. The z function means that only the x-coordinate is available, so that decompression would have to be applied to obtain the full point R. In the case of the ECRNG, there would be somewhere between about $2^6$=64 and $2^{19}$ (i.e. about half a million) possible points R which correspond to r, with the exact number depending on the curve and the specific value of r.

The full set of R values is easy to determine from r, and as noted above, determination of the correct value for R determines U=eR, if one knows e. The updated state is u=z(U), so it can be determined from the correct value of R. Therefore knowledge of r and e allows one to determine the next state to within a number of possibilities somewhere between $2^6$ and $2^{19}$. This uncertainty will invariably be eliminated once another output is observed, whether directly or indirectly through a one-way function.

Once the next state is determined, all future states of ECRNG can be determined because the ECRNG is a deterministic function. (at least unless additional random entropy is fed into the ECRNG state) All outputs of the ECRNG are determined from the determined states of the ECRNG. Therefore knowledge of r and e, allows one to determine all future outputs of the ECRNG.

It has therefore been identified by the applicant that this method potentially possesses a trapdoor, whereby standardizers or implementers of the algorithm may possess a piece of information with which they can use a single output and an instantiation of the RNG to determine all future states and output of the RNG, thereby completely compromising its security. It is therefore an object of the present invention to obviate or mitigate the above mentioned disadvantages.

SUMMARY OF THE INVENTION

In one aspect, the present invention provides a method for computing a verifiably random point Q for use with another point P in an elliptic curve random number generator comprising computing a hash including the point P as an input, and deriving the point Q from the hash.

In another aspect, the present invention provides a method for producing an elliptic curve random number comprising generating an output using an elliptic curve random number generator, and truncating the output to generate the random number.

In yet another aspect, the present invention provides a method for producing an elliptic curve random number comprising generating an output using an elliptic curve random number generator, and applying the output to a one-way function to generate the random number.

In yet another aspect, the present invention provides a method of backup functionality for an elliptic curve random number generator, the method comprising the steps of computing an escrow key e upon determination of a point Q of the elliptic curve, whereby P=eQ, P being another point of the elliptic curve; instituting an administrator, and having the administrator store the escrow key e; having members with an elliptic curve random number generator send to the administrator, an output r generated before an output value of the generator; the administrator logging the output r for future determination of the state of the generator.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
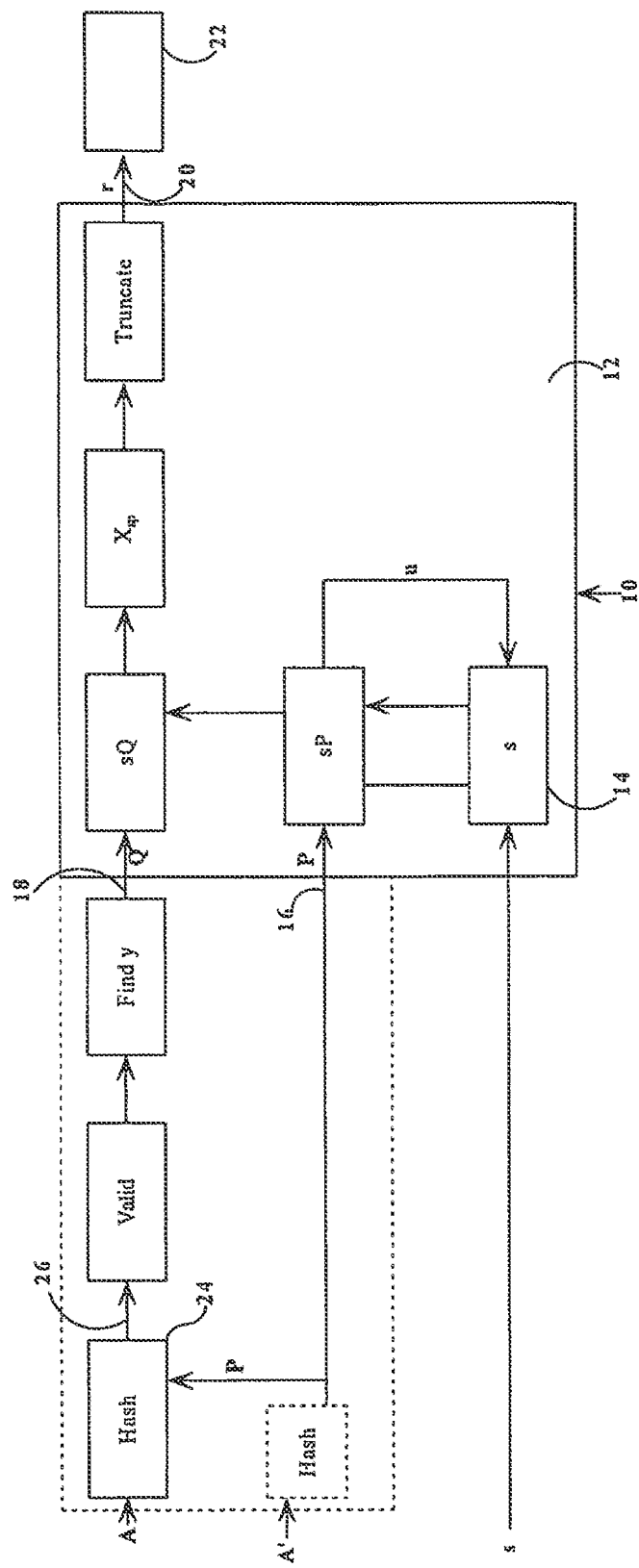
FIG. 1 is a schematic representation of a cryptographic random number generation scheme.

Referring therefore to FIG. 1, a cryptographic random number generator (ECRNG) 10 includes an arithmetic unit 12 for performing elliptic curve computations. The ECRNG also includes a secure register 14 to retain a state value s and has a pair of inputs 16, 18 to receive a pair of initialisation points P, Q. The points P, Q are elliptic curve points that are assumed to be known. An output 20 is provided for communication of the random integer to a cryptographic module 22. The initial contents of the register 14 are provided by a seed input S.

This input 16 representing the point P is in a first embodiment, selected from a known value published as suitable for such use.

The input 18 is obtained from the output of a one way function in the form of a hash function 24 typically a cryptographically secure hash function such as SHA1 or SHA2 that receives as inputs the point P. The function 24 operates upon an arbitrary bit string A to produce a hashed output 26. The output 26 is applied to arithmetic unit 12 for further processing to provide the input Q.

In operation, the ECRNG receives a bit string as a seed, which is stored in the register 14. The seed is maintained secret and is selected to meet pre-established cryptographic criteria, such as randomness and Hamming weight, the criteria being chosen to suit the particular application.

Figure 2:
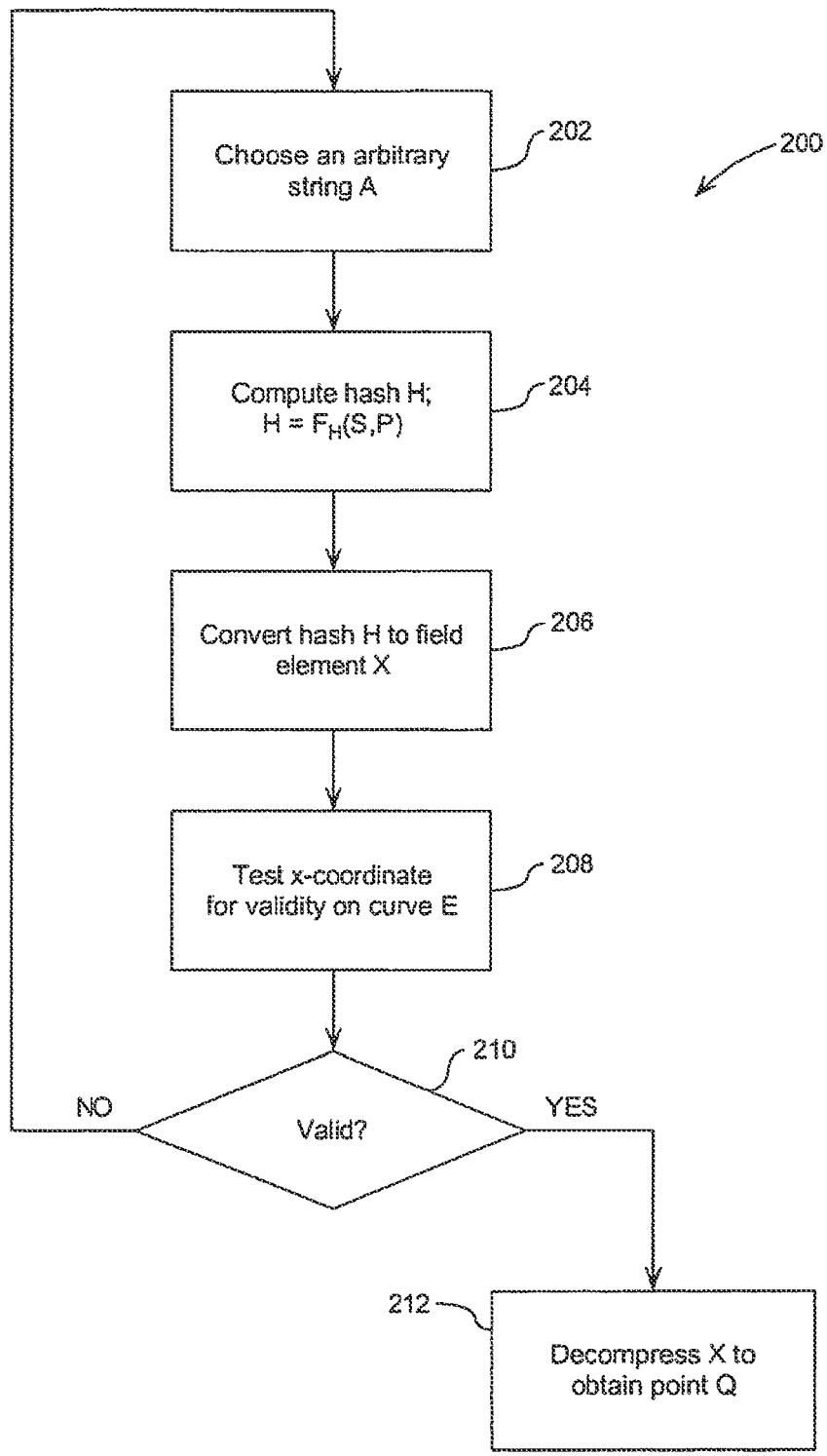
FIG. 2 is a flow chart illustrating a selection process for choosing elliptic curve points.

In order to ensure that d is not likely to be known (e.g. such that P=dQ, and ed=1 mod n); one or both of the inputs 16, 18 is chosen so as to be verifiably random. In the embodiment of FIG. 1, Q is chosen in a way that is verifiably random by deriving it from the output of a hash-function 24 (preferably one-way) whose input includes the point P. As shown in FIG. 2 an arbitrary string A is selected at step 202, a hash H of A is computed at step 204 with P and optionally S as inputs to a hash-based function $F_H()$, and the hash H is then converted by the arithmetic unit 12 to a field element X of a desired field Fat step 206. P may be pre-computed or fixed, or may also be chosen to be a verifiably random chosen value. The field element X is regarded as the x-coordinate of Q (thus a "compressed" representation of Q). The x-coordinate is then tested for validity on the desired elliptic curve E at step 208, and whether or not X is valid, is determined at step 210. If valid, the x-coordinate provided by element X is decompressed to provide point Q at step 212. The choice of which of two possible values of the y co-ordinate is generally derived from the hash value.

The points P and Q are applied at respective inputs 16, 18 and the arithmetic unit 12 computes the point sQ where s is the current value stored in the register 14. The arithmetic unit 12 converts the x-coordinate of the point (in this example point sQ) to an integer and truncates the value to obtain r=t(z(sQ)). The truncated value r is provided to the output 20.

The arithmetic unit 12 similarly computes a value to update the register 14 by computing sP, where s is the value of the register 14, and converting the x-coordinate of the point sP to an integer u. The integer u is stored in the register to replace s for the next iteration. {ditto above}

As noted above, the point P may also be verifiably random, but may also be an established or fixed value, Therefore, the embodiment of FIG. 1 may be applied or retrofitted to systems where certain base points (e.g. P) are already implemented in hardware. Typically, the base point P will be some already existing base point, such as those recommended in Federal Information Processing Standard (FIPS) 186-2. In such cases, P is not chosen to be verifiably random.

In general, inclusion of the point P in the input to the hash function ensures that P was determined before Q is determined, by virtue of the one-way property of the hash function and since Q is derived from an already determined P. Because P was determined before Q, it is clearly understood that P could not have been chosen as a multiple of Q (e.g. where P=eQ), and therefore finding d is generally as hard as solving a random case of the discrete logarithm problem.

Thus, having a seed value S provided and a hash-based function F() provided, a verifier can determine that Q=F(S, P), where P may or may not be verifiably random. Similarly, one could compute P=F(S,Q) with the same effect, though it is presumed that this is not necessary given that the value of P in the early drafts of X9.82 were identical to the base points specified in FIPS 186-2.

The generation of Q from a bit string as outlined above may be performed externally of the ECRNG 10, or, preferably, internally using the arithmetic unit 12. Where both P and Q are required to be verifiably random, a second hash function 24 shown in ghosted outline in FIG. 1 is incorporated to generate the coordinate of point P from the bit string A. By providing a hash function for at least one of the inputs, a verifiably random input is obtained.

It will also be noted that the output generated is derived from the x coordinate of the point sP. Accordingly, the inputs 16, 18 may be the x coordinates of P and Q and the corresponding values of sP and sQ obtained by using Montgomery multiplication techniques thereby obviating the need for recovery of the y coordinates.

An alternative method for choosing Q is to choose Q in some canonical form, such that its bit representation contains some string that would be difficult to produce by generating Q=dP for some known d and P for example a representation of a name. It will be appreciated that intermediate forms between this method and the preferred method may also exist, where Q is partly canonical and partly derived verifiably at random. Such selection of Q, whether verifiably random, canonical, or some intermediate, can be called verifiable.

Figure 3:
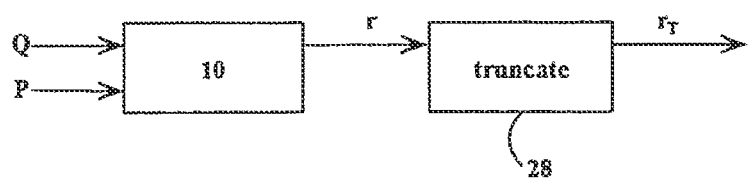
FIG. 3 is a block diagram, similar to FIG. 1 showing a further embodiment
Figure 4:
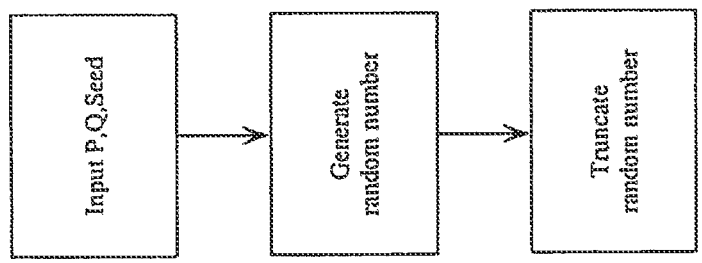
FIG. 4 is flow chart illustrating the process implemented by the apparatus of FIG. 3.

Another alternative method for preventing a key escrow attack on the output of an ECRNG, shown in FIGS. 3 and 4 is to add a truncation function 28 to ECRNG 10 to truncate the ECRNG output to approximately half the length of a compressed elliptic curve point. Preferably, this operation is done in addition to the preferred method of FIGS. 1 and 2, however, it will be appreciated that it may be performed as a primary measure for preventing a key escrow attack. The benefit of truncation is that the list of R values associated with a single ECRNG output r is typically infeasible to search. For example, for a 160-bit elliptic curve group, the number of potential points R in the list is about $2^{80}$, and searching the list would be about as hard as solving the discrete logarithm problem. The cost of this method is that the ECRNG is made half as efficient, because the output length is effectively halved.

Figure 5:
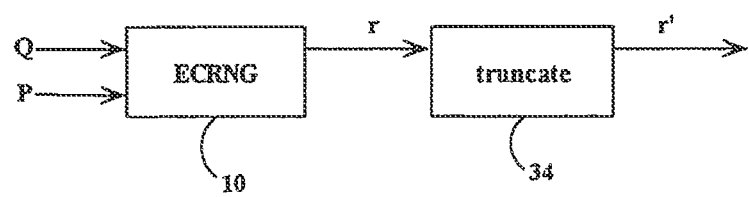
FIG. 5 is a block diagram showing a further embodiment.
Figure 6:
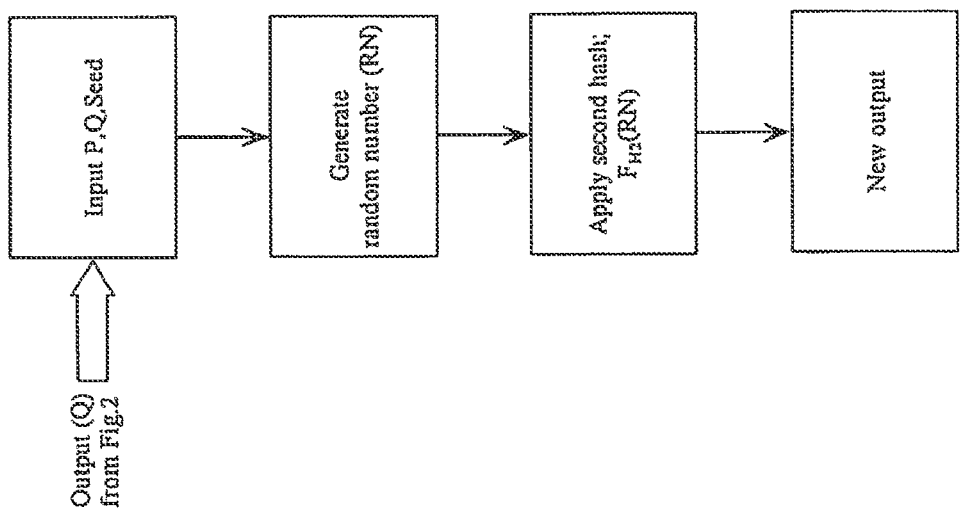
FIG. 6 is a flow chart illustrating yet another embodiment of the process of FIG. 2.

Yet another alternative method shown in FIGS. 5 and 6 comprises filtering the output of the ECRNG through another one-way function $F_{H2}$, identified as 34, such as a hash function to generate a new output. Again, preferably, this operation is performed in addition to the preferred method shown in FIG. 2, however may be performed as a primary measure to prevent key escrow attacks. The extra hash is relatively cheap compared to the elliptic curve operations performed in the arithmetic unit 12, and does not significantly diminish the security of the ECRNG.

As discussed above, to effectively prevent the existence of escrow keys, a verifiably random Q should be accompanied with either a verifiably random P or a preestablished P. A pre-established P may be a point P that has been widely publicized and accepted to have been selected before the notion of the ECRNG 12, which consequently means that P could not have been chosen as P=eQ because Q was not created at the time when P was established.

Whilst the above techniques ensure the security of the system using the ECRNG by "closing" the trap door, it is also possible to take advantage of the possible interdependence of P and Q, namely where P=eQ, through careful use of the existence of e.

In such a scenario, the value e may be regarded as an escrow key. If P and Q are established in a security domain controlled by an administrator, and the entity who generates Q for the domain does so with knowledge of e (or indirectly via knowledge of d). The administrator will have an escrow key for every ECRNG that follows that standard.

Escrow keys are known to have advantages in some contexts. They can provide a backup functionality. If a cryptographic key is lost, then data encrypted under that key is also lost. However, encryption keys are generally the output of random number generators. Therefore, if the ECRNG is used to generate the encryption key K, then it may be possible that the escrow key e can be used to recover the encryption key K. Escrow keys can provide other functionality, such as for use in a wiretap. In this case, trusted law enforcement agents may need to decrypt encrypted traffic of criminals, and to do this they may want to be able to use an escrow key to recover an encryption key.

Figure 7:
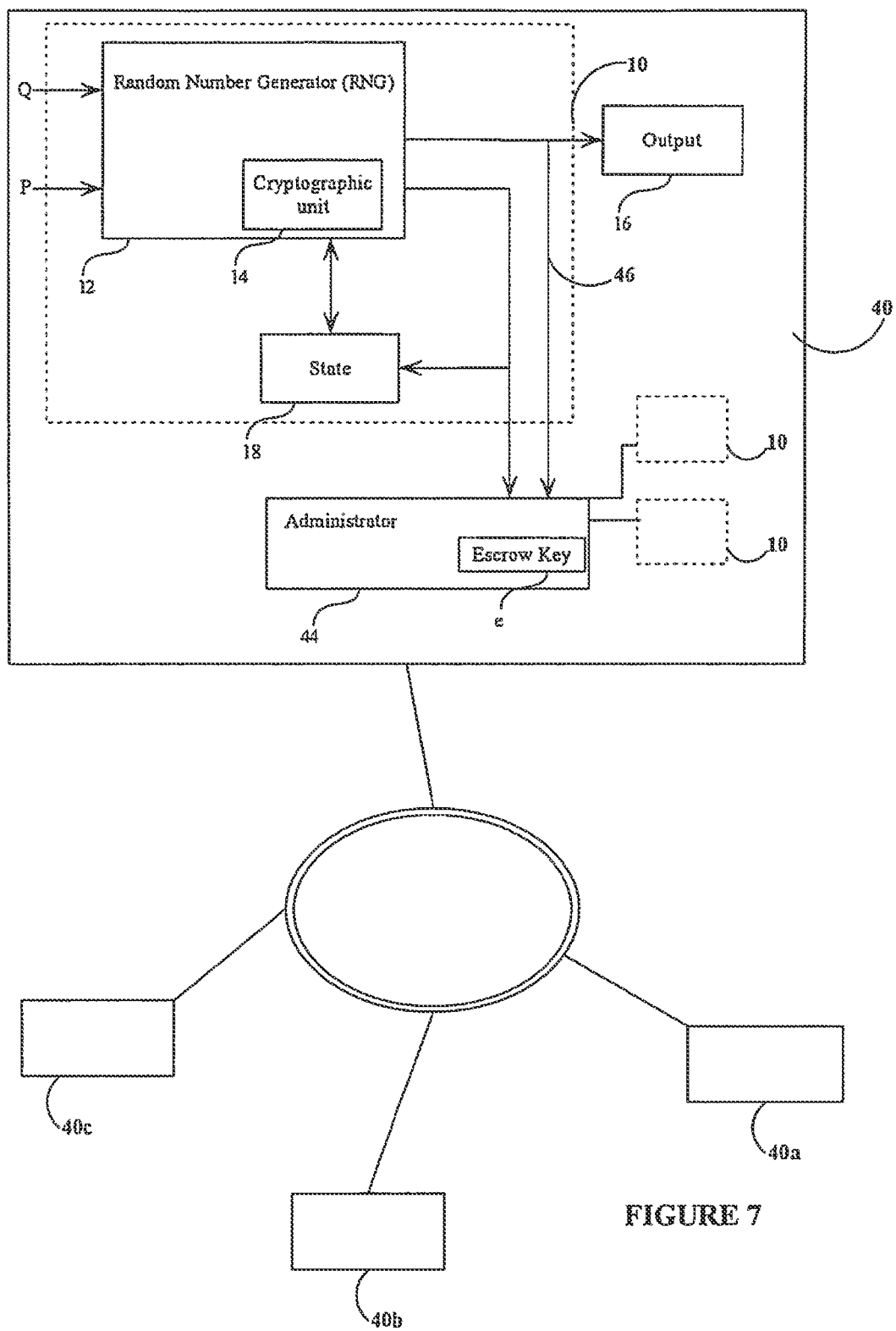
FIG. 7 is schematic representation of an administrated cryptographic random number generation scheme.

FIG. 7 shows a domain 40 having a number of ECRNG's 10 each associated with a respective member of the domain 40. The domain 40 communicates with other domains 40a, 40b, 40c through a network 42, such as the interne. Each ECRNG of a domain has a pair of identical inputs P,Q. The domain 40 includes an administrator 44 who maintains in a secure manner an escrow key e.

The administrator 44 chooses the values of P and Q such that he knows an escrow key e such that Q=eP. Other members of the domain 40 use the values of P and Q, thereby giving the administrator 44 an escrow key e that works for all the members of the organization.

This is most useful in its backup functionality for protecting against the loss of encryption keys. Escrow keys e could also be made member-specific so that each member has its own escrow e' from points selected by the administrator 44.

Figure 8:
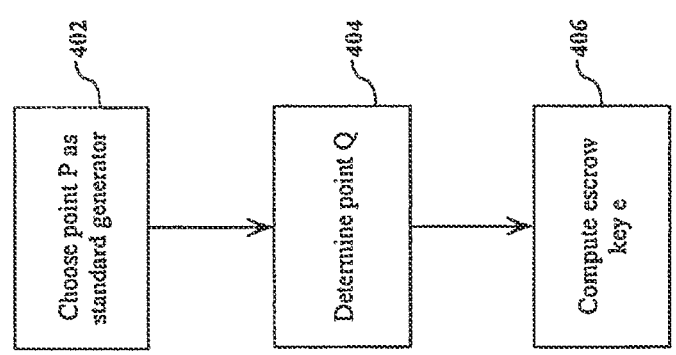
FIG. 8 is a flow chart illustrating an escrow key selection process.

As generally denoted as numeral 400 in FIG. 8, the administrator initially selects a point P which will generally be chosen as the standard generator P for the desired elliptic curve 402. The administrator then selects a value d and the point Q will be determined as Q=dP 404, for some random integer d of appropriate size. The escrow key e is computed as $e=d^{-1} \mod n$ 406, where n is the order of the generator P and stored by the administrator.

Figure 9:
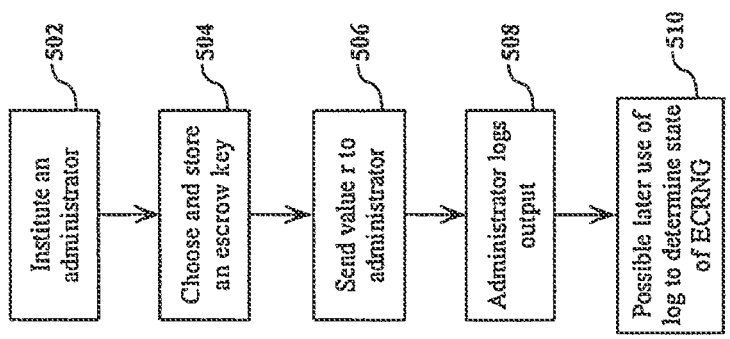
FIG. 9 is a flow chart illustrating a method for securely utilizing an escrow key.

The secure use of such an escrow key 34e is generally denoted by numeral 500 and illustrated in FIG. 9. The administrator 44 is first instituted 502 and an escrow keys e would be chosen and stored 504 by the administrator 44

In order for the escrow key to function with full effectiveness, the escrow administrator 44 needs direct access to an ECRNG output value r that was generated before the ECRNG output value k (i.e. 16) which is to be recovered. It is not sufficient to have indirect access to r via a one-way function or an encryption algorithm. A formalized way to achieve this is to have each member with an ECRNG 12 communicate with the administrator 44 as indicated at 46 in FIG. 7. and step 506 in FIG. 9. This may be most useful for encrypted file storage systems or encrypted email accounts. A more seamless method may be applied for cryptographic applications. For example, in the SSL and TLS protocols, which are used for securing web (HTTP) traffic, a client and server perform a handshake in which their first actions are to exchange random values sent in the clear.

Many other protocols exchange such random values, often called nonces. If the escrow administrator observes these nonces, and keeps a log of them 508, then later it may be able to determine the necessary r value. This allows the administrator to determine the subsequent state of the ECRNG 12 of the client or server 510 (whoever is a member of the domain), and thereby recover the subsequent ECRNG 12 values. In particular, for the client who generally generates a random pre-master secret from which is derived the encryption key for the SSL or TLS session, the escrow key may allow recovery of the session key. Recovery of the session key allows recovery of the whole SSL or TLS session.

If the session was logged, then it may be recovered. This does not compromise long-term private keys, just session keys obtained from the output of the ECRNG, which should alleviate any concern regarding general suspicions related to escrows.

Whilst escrow keys are also known to have disadvantages in other contexts, their control within specific security domains may alleviate some of those concerns. For example, with digital signatures for non-repudiation, it is crucial that nobody but the signer has the signing key, otherwise the signer may legitimately argue the repudiation of signatures. The existence of escrow keys means the some other entity has access to the signing key, which enables signers to argue that the escrow key was used to obtain their signing key and subsequently generate their signatures. However, where the domain is limited to a particular organisation or part of an organisation it may be sufficient that the organisation cannot repudiate the signature. Lost signing keys do not imply lost data, unlike encryption keys, so there is little need to backup signing keys.

Although the invention has been described with reference to certain specific embodiments, various modifications thereof will be apparent to those skilled in the art without departing from the spirit and scope of the invention as outlined in the claims appended hereto.

What is claimed is:

1. A method of operating an elliptic curve random number generator (ECRNG) including an arithmetic unit to perform elliptic curve operations to compute a random number for use in a cryptographic operation, said method performed by a hardware processor of a device including the ECRNG, and said method comprising the steps of:
    obtaining, at the device, a pair of inputs, wherein each input is representative of at least one coordinate of respective ones of a pair of elliptic curve points, and wherein one point of the pair of elliptic curve points is not a known multiple of the other point of the pair of elliptic curve points;
    providing, at the device, said pair of inputs as inputs to said arithmetic unit;
    performing, by said arithmetic unit, selected elliptic curve operations on said inputs to obtain an output, wherein said selected elliptic curve operations is performed independent of escrow keys separate from said pair of inputs to improve security of the cryptographic operation;
    utilizing said output as a random number in the cryptographic operation to generate, at the device, encrypted data; and
    transmitting, by the device, the encrypted data to a different device in a network.

2. The method of claim 1, wherein said at least one of said inputs is obtained from an output of a hash function.

3. The method of claim 2, wherein the other of said inputs is utilized as an input to said hash function.

4. The method of claim 1, wherein said random number generator has a secret value and said secret value is used to compute scalar multiples of said points represented by said inputs.

5. The method of claim 4, wherein one of said scalar multiples is used to derive said random number and the other of said scalar multiples is used to change said secret value for subsequent use.

6. The method of claim 2, wherein said output of said hash function is validated as a coordinate of a point on an elliptic curve prior to utilization as said input.

7. The method of claim 6, wherein another coordinate of said point is obtained from said one coordinate for inclusion as said one input.

8. The method of claim 7, wherein said other input is a representation of an elliptic curve point.

9. The method of claim 5, wherein said random number is derived from said one scalar multiple by selecting one coordinate of a point represented by said one scalar multiple and truncating said one coordinate to a bit string for use as said random number.

10. The method of claim 9, wherein said one coordinate is truncated in the order of one half the length of a representation of an elliptic curve point representation.

11. The method of claim 5, wherein said random number is derived from said one scalar multiple by selecting one coordinate of said point represented by said scalar multiple and hashing said one coordinate to provide a bit string for use as said random number.

12. The method of claim 1, wherein said at least one of said inputs is chosen to be of a canonical form.

13. The method of claim 1, wherein said output is passed through a one way function to obtain a bit string for use as a random number.

14. The method of claim 13, wherein said one way function is a hash function.

15. The method of claim 1, wherein obtaining one of the inputs includes obtaining a result of a hash function that is performed on said one input.

16. An elliptic curve random number generator (ECRNG) configured to perform elliptic curve operations to compute a random number for use in a cryptographic operation, the ECRNG comprising:
    one or more hardware processors configured to:
        generate, at the ECRNG, a pair of inputs, wherein each of said inputs is representative of at least one coordinate of respective ones of a pair of elliptic curve points, and wherein one point of the pair of elliptic curve points is not a known multiple of the other point of the pair of elliptic curve points;
        perform, at the ECRNG, selected elliptic curve operations on said inputs to obtain an output, said output representing a random number for use in the cryptographic operation to generate encrypted data, and said selected elliptic curve operations is performed independent of escrow keys separate from said pair of inputs to improve security of the cryptographic operation; and
        transmit the encrypted data to a different device in a network.

17. The elliptic curve random number generator of claim 16, wherein generate said inputs includes a one way function and at least one of said inputs is derived from an output of a one way function.

18. The elliptic curve random number generator of claim 17, wherein said one way function is a hash function.

19. The elliptic curve random number generator of claim 16, wherein one of said inputs is obtained from an output of a hash function, and the other of said inputs is provided as an input to said hash function.

* * * * *